UNITED STATES PATENT OFFICE.

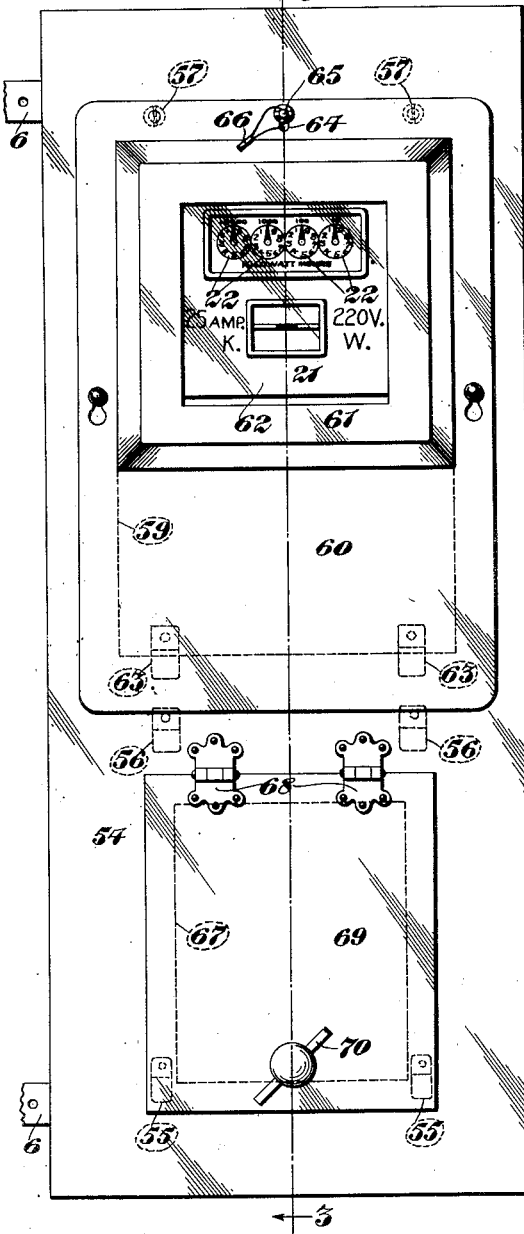
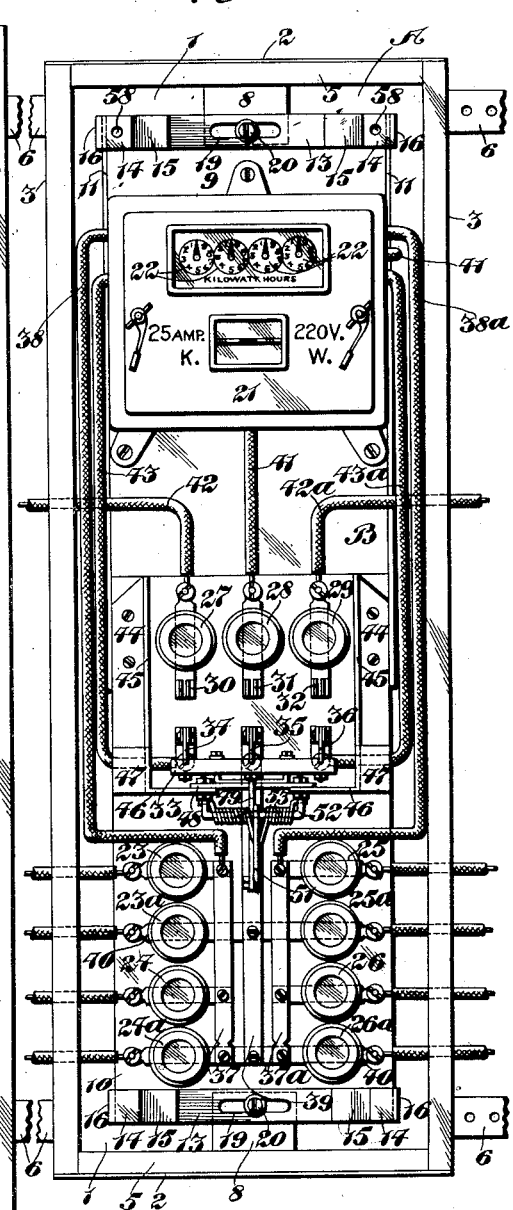

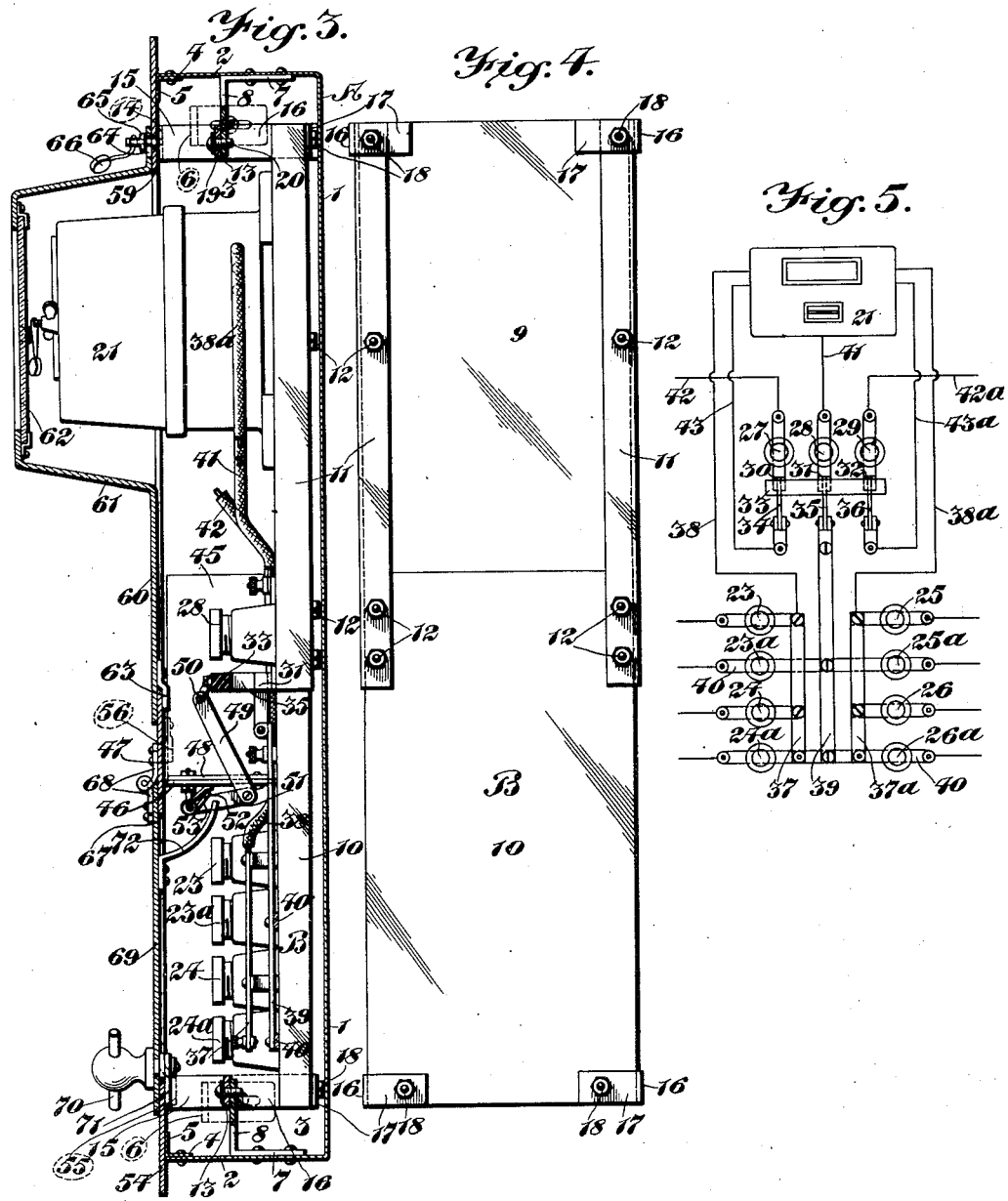

WILLIAM WURDACK, OF ST. LOUIS, MISSOURI.

METERING PANEL-BOARD AND CABINET THEREFOR.

1,269,770.

Specification of Letters Patent.  Patented June 18, 1918.

Application filed August 11, 1916.  Serial No. 114,404.

*To all whom it may concern:*

Be it known that I, WILLIAM WURDACK, a citizen of the United States, residing at the city of St. Louis, State of Missouri, have invented certain new and useful Improvements in Metering Panel-Boards and Cabinets Therefor, of which the following is a specification, reference being had to the accompanying drawings, forming a part thereof.

This invention relates to certain new and useful improvements in metering panel-boards and cabinets therefor.

The principal objects of my present invention are to provide a panel-board and cabinet with coöperating parts whereby the panel-board may be detachably fastened operatively within, and adjustably relative to, the cabinet; to provide a panel-board and cabinet having a cover or lid adapted to be removably fastened in cabinet-closing position by engagement only with the panel-board; to provide a panel-board and cabinet wherein the meter and all parts of the circuit within the cabinet and ahead of the meter are protected and prevented from being tampered with by unauthorized persons; and to improve generally upon the construction of panel-boards and cabinets of the kind described.

With the above and other objects in view, my present invention resides in certain novel features of form, construction, arrangement, and combination of parts, all as will hereinafter be described and afterward pointed out in the claims.

In the accompanying drawings, in which my invention is illustrated in preferred form,—

Figure 1 is a front elevational view of a panel-board cabinet embodying my invention;

Fig. 2 is a similar view showing the panel-board within the cabinet, the cover or lid of the cabinet being removed;

Fig. 3 is a vertical sectional view through the panel-board and cabinet on approximately the line 3—3, Fig. 1, the meter being in side elevation;

Fig. 4 is a rear elevational view of the panel-board; and

Fig. 5 is a diagrammatic view of the panel-board and meter wirings.

Referring to the said drawings, in which like reference characters refer to like parts throughout the several views, my new panel-board cabinet or box A, which is of suitable depth and preferably of rectangular shape and of sheet metal, comprises a rear wall 1, end walls 2—2, and side walls 3—3. At their upper edges, the end and side walls 2 and 3 have fixed thereto suitable angle-bars 4 or are otherwise suitably formed so as to provide an inwardly presented flange 5 extending interiorly around within the box, as seen in Fig. 2. In use, the box A is usually arranged in the wall of a building with its flange 5 approximately flush with the surface thereof, as will be well understood; and to facilitate the mounting of the box, I adjustably fasten to and upon the outer faces of side walls 3 suitable outwardly projecting metallic straps 6 perforated, as shown, to accommodate fastening-nails or the like for rigidly securing the box to the partition or wall-beams. Adjustably secured at one leg or portion 7 to and approximately centrally upon the inner face of each end wall 2 of the box A is a suitable panel-supporting angle-bracket having its other leg or portion 8 presented inwardly of the box approximately parallel with rear wall 1 thereof, as seen in Fig. 3.

B indicates the panel-board, which is of suitable relative size to easily fit flatwise within box A. Preferably, to lessen manufacturing costs and reduce weight, panel B comprises an upper section 9 of wood and a lower section 10 of marble, slate, or the like, said sections being rigidly fixed edgewise together by angle-irons 11—11 extending longitudinally along the side and rear faces of the sections and secured thereto by bolts 12, as seen in Figs. 3 and 4. At the opposite ends of panel B, I provide suitable metallic straps, whereby the panel may be detachably and adjustably secured in the box A. These straps each comprise a depressed central portion 13 adapted to engage flatwise upon the angle-members 8, cover or lid supporting-portions or brackets 14—14 disposed on opposite sides of central portion 13 and united thereto by obliquely upwardly and outwardly disposed portions 15—15, the portions 13 and 14—14 extending transversely of, and approximately parallel with, the upper face of panel B, and side portions or legs 16 disposed at right angles to panel B and bent therearound at their ends, as at 17, each strap being rigidly fixed to the panel by bolts or the like 18, as seen in Fig. 4, and the legs 16 being of such length that, angle-members 8 being in innermost adjusted position in the cabinet and central strap-portions 13 fitting and engaging thereupon as described, the upper face of brackets 14 will be approximately flush with the upper face of flange 5. Each central strap-portion 13 is provided longitudinally with a slot 19 adapted to adjustably accommodate a screw or the like 20 engaging the angle-member 8, whereby, to compensate for possible faults or irregularities in construction or in the position of box A in the wall or partition, the panel B may be not only detachably, but also adjustably, fastened in the box A in an approximately true vertically disposed position relatively to the building-wall or partition in which the box or cabinet A may be mounted.

My new panel-board and cabinet are shown and will be described herein in connection with an electric lighting installation, and, for purposes of illustration, I have shown a three-wire system of distribution with but four lamp circuits; but it will be understood that my new panel-board and cabinet might equally well be employed in other electric installations or with other wiring systems.

Suitably fastened and secured preferably upon upper wooden section 9 of panel B, is an electric meter 21 of any approved construction and having the usual dials 22.

Mounted in any suitable manner preferably on the lower section 10 of panel B are a plurality of pairs of lamp-circuit fuse-plug-sockets of any suitable type, in and with which sockets are adapted to fit and coöperate suitable fuse-plugs, or fuses, as they are often designated. For convenience of reference, I have numbered these fuse-plugs 23—23$^a$, 24—24$^a$, 25—25$^a$, and 26—26$^a$. And also arranged on panel-section 10 above and at a suitable distance from said lamp-circuit fuse-plugs and sockets are a plurality of main fuse-plug sockets; in the system of distribution here shown, there are three main fuse-plug sockets, in and with which fit and coöperate main fuse-plugs or fuses 27, 28, and 29. Also mounted on panel section 10 and having electrical connection with said main sockets and their plugs 27, 28, and 29, respectively, are suitable knife-switch or snap terminals 30, 31, and 32. Pivoted electrically upon panel-section 10 adjacent to said terminals, is a knife-switch hereinafter more fully described and including an insulation-bar 33 having fixed thereto suitable blades 34, 35, and 36 adapted, when the switch is in circuit closing position, to engage electrically with said terminals 30, 31. and 32, respectively.

Mounted on panel-section 10 in operative relation to the lamp-circuit sockets, are suitable bus-bars 37—37$^a$. With bar 37, the lamp-circuit sockets 23 and 24 are suitably electrically connected, and with other bar 37$^a$, the lamp-circuit sockets 25 and 26 have suitable electrical connection. To the bars 37—37$^a$, the supply-wires 38—38$^a$ from the meter 21 are also electrically connected, the current from the meter passing on to the circuit or the lamps through suitable wires, as shown, having, in turn, electrical connection with the lamp-circuit sockets and their fuses 23, 24, 25, and 26.

Mounted on panel-section 10 intermediate the bus-bars 37—37$^a$, is the neutral bus-bar 39 having electrical connection at its upper end with center knife-blade 35. With bar 39 the remaining or return lamp-circuit sockets and their fuses 23$^a$, 24$^a$, 25$^a$, and 26$^a$ have electrical connection by means of suitable cross-bars 40—40, as illustrated particularly in Figs. 2 and 5. Electrically connected to center main socket and its plug 28, is the neutral line wire 41 leading to the service mains (not shown), as will be well understood, the current from the lamps returning to this wire 41, the switch being in circuit-closing position, through suitable wires, as shown, having electrical connection, in turn, with the return sockets and fuses 23$^a$, 24$^a$, 25$^a$, and 26$^a$.

Leading into the cabinet or box A through suitable apertures provided preferably in its side walls 3, are the main line wires or leads 42—42$^a$, the same having electrical connection within the cabinet or box A with the main sockets and their fuses 27 and 29, respectively. And leading into the meter 21 and having electrical connection with the remaining knife-blades 34 and 36, respectively, are connecting wires 43—43$^a$, the wires 38—38$^a$ and 43—43$^a$ being wholly within the cabinet or box A, as seen in Fig. 2.

Thus it will be evident that, when the said knife-switch is in open position or in the position thereof illustrated in Fig. 2, the circuit to the meter from main leads 42—42$^a$, and consequently also from the meter to the several lamp-circuits included in the system, is also open or broken, and that when the knife switch is in closed position or in the position thereof illustrated in Fig. 5, the circuit to and from the meter 21 is likewise closed.

Bent laterally at their inner edges to provide outwardly projecting flanges 44, are preferably sheet metal sections 45 further bent laterally at their lower ends to provide oppositely disposed inwardly projecting portions 46 spaced apart at their inner ends, as seen in Fig. 2, the sections 45 being fixed at their flanges 44 to and upon panel-section 10 and forming substantially a three wall casing or housing inclosing within the cabinet or box A the main sockets and their fuse-plugs 27, 28, and 29, the knife-bar 33 and its blades 34, 35, and 36, and also the knife-terminals 30, 31, and 32, as seen in Fig. 2. At their upper edges and adjacent the portions 46, the sections 45 are provided with laterally projecting lips or brackets 47, for purposes hereinafter appearing, the sections 45 being preferably of suitable height to engage the under face of the cabinet-cover when the same is operatively upon the brackets 14.

Riveted or otherwise fixed to and reinforcing the portions 46 of the sections 45 and spanning or bridging the space therebetween, is a plate 48 slotted transversely to accommodate a link 49 pivotally connected at one end, as at 50, to knife-bar 33. Link 49 is pivotally connected at its other end to a second link 51, which second link 51 is, in turn, at its free end pivotally connected to a short rod 52 bent laterally and suitably fixed at its ends, as seen particularly in Fig. 2, to the portions 46 of sections 45 and their reinforcing plate 48. Coiled on the rod 52 are springs 53 which bear at one end upon the under face of reinforced sections 46 and engage at their other end with link 51, and under the tension of which springs the knife-bar 33 and its several blades 34, 35, and 36 are normally held yieldingly in open or circuit-breaking position or in the said position thereof illustrated in Fig. 2.

54 indicates the main cover-section for the cabinet or box A and panel B. This cover-section 54, which is of suitable metallic material and adapted to fit flatwise upon the brackets 14 of the panel B, is preferably of somewhat larger dimensions than box A and is thereby adapted to provide at its projecting or overhanging marginal portion a neat trim for the box when the same is in operative position in a partition or wall. Fixed upon the inner face of cover section 54 in operative position relative, respectively, to the cover-supporting portions or brackets 14 of the lower panel strap and to said lips 47, are pairs of spaced downwardly presented angle-members or hooks 55—55 and 56—56 adapted, when the cover-section 54 is operatively fitted upon the box A, to enter the cabinet at the front thereof and detachably engage, also respectively, with said lower brackets 14 and said lips 47 to secure the cover rigidly at its lower portion removably upon the box. And adjacent its upper end and in operative position relatively to the brackets 14 of the upper panel-strap, cover-section 54 is provided with suitable perforations to accommodate the entrance into the cabinet at the front thereof of securing-screws or the like 57 adapted to enter suitable threaded perforations 58 in, and thereby detachably engage with, said upper strap portions or brackets 14 to removably fasten the cover section 54 rigidly upon the cabinet.

In its upper portion, the main cover section 54 is provided with an enlarged aperture, as at 59, to accommodate the meter 21 and through which access may be had, cover section 54 being fastened upon the box A as described, to the main sockets and their fuses 27, 28 and 29. And adapted to fit upon the main cover section 54 and close this aperture 59, is an auxiliary or supplementary cover-section 60 having a meter-accommodating portion 61 projecting outwardly beyond the plane of main cover section 54, as seen in Fig. 3, the cover-portion 61 being provided with a section of glass or other transparent material 62 through which the meter-dials 22 may be visually observed and read. Adjacent its lower end and upon its inner face, this auxiliary cover section 60 is likewise provided with downwardly presented angle-members or hooks 63 adapted to engage with cover-section 54 at the lower rim of aperture 59 in securing this cover-section 60 in aperture-closing position, the cover-section 60 being provided at its upper end with a suitable perforation 64 to accommodate a stud or the like 65 projecting from main cover section 54. To prevent unauthorized removal of the cover-section 60, as well as also of the main cover section 54, said cover-section 60 projecting over, covering, and concealing the main section securing-screws 57, I pass a suitable wire-seal or the like 66 through the stud 65, as seen in Figs. 1 and 3. Thus the cover, comprising the main section 54 and auxiliary section 60, is conveniently fastened against removal upon the cabinet or box A and over the panel B, the securing means described having engagement only with the panel B; and the panel B being adjustable in the cabinet A as described to an approximately true vertically disposed position relatively to the partition or wall in which the box A may be mounted, the cover also and correspondingly will occupy a neat, approximately true vertically disposed position relatively to such partition or wall.

In its lower portion, to provide means of access for inspection or other purpose to the lamp-circuit fuses and their associate parts mounted on the panel B, main cover section 54 is provided with a second aperture 67; and hingedly fastened, as at 68, upon cover section 54 to close said aperture 67, is a swingable door 69 provided with a suitable handle 70 having fixed thereto a suitable latch or catch 71 adapted to project within the cabinet A and, on proper turning of handle 70, engage with cover-section 54 at the lower rim of its aperture 67 to releasably lock the door 69 in aperture-closing position.

Fixed upon the inner face of door 69 is a suitable rigid curved finger or the like 72 preferably bifurcated at its inner or free end, this finger 72 being adapted, on the closing of door 69, to engage with switch-link 51 to actuate the switch-bar 33 and its blades 34, 35, and 36, against the tension of springs 53 to circuit-closing position, said blades, under the engagement of the finger 72 with the switch-link 51 while the door 69 is in aperture-closing position, being maintained in engagement with their terminals 31, 31, and 32 and consequently in circuit-closing position. On the opening of door 69, it will be evident that, under the tension or pull of springs 53, said blades will automatically move out of electrical engagement with their said terminals and consequently open or break the circuit to and from the meter 21. Thus, the circuit to and from the meter 21 being automatically broken or opened on the opening of the door 69, the lamp-circuit sockets and fuse-plugs and associate parts within the cabinet may be inspected or otherwise handled with safety. And when the door 69 is in open position, it will now be seen that, by reason of the housing provided by the sections or walls 45 within the cabinet around the main fuse-sockets and their plugs and associate parts, access to the meter and to all parts of the circuit within the cabinet ahead of the meter is prevented.

I am aware that minor changes in the form, construction, arrangement, and combination of the several parts of my new panel board and cabinet may be made and substituted for those herein shown and described without departing from the nature and principle of my invention.

Having thus described my invention, what I claim and desire to secure by Letters Patent is:

1. The combination with an inclosing cabinet, of a panel-board mounted securely within the cabinet, brackets fixed on the panel-board, a cover-section adapted to fit upon the cabinet and extend over the panel-board and its brackets, and members adapted to enter the cabinet at the front thereof for removably securing the cover-section rigidly in closing position on the cabinet, said members being detachably engageable with said brackets.

2. The combination with a cabinet, of a panel-board secured within the cabinet, a cover-section fitting on the cabinet over the panel-board, and means for removably securing the cover-section in closing position on the cabinet, said means including a hook on the cover-section engaging only with the panel-board.

3. The combination with an inclosing cabinet, of a panel-board mounted securely within the cabinet, a bracket fixed on the panel-board, a cover-section adapted to fit upon the cabinet and extend over the panel-board and its bracket, and means including a fastening-member adapted to enter the cabinet at the front thereof for removably securing the cover-section rigidly in closing position on the cabinet, said fastening-member being adapted to extend through the cover-section and detachably engage with said bracket.

4. The combination with a cabinet, of a panel-board secured within the cabinet, a bracket on the panel-board, a cover-section fitting on the cabinet over the panel-board and its bracket, and means for removably securing the cover-section in closing position on the cabinet, said means including a hook on the cover-section adapted to detachably engage with said bracket.

5. The combination with a cabinet, of a panel-board secured within the cabinet, a bracket on the panel-board, a cover-section fitting on the cabinet over the panel-board and its bracket, and means for removably securing the cover-section in closing position on the cabinet, said means including a fastening member engaging only the cover-section and said bracket.

6. The combination with a cabinet, of a panel-board secured within the cabinet, a plurality of brackets on the panel-board, a cover-section fitting on the cabinet over the panel-board and its brackets, and means for removably securing the cover-section in closing position on the cabinet, said means including a rigid hook on the cover-section adapted to engage with one of said brackets, and a fastening member engaging the cover-section and the other bracket.

7. The combination with a cabinet, of a panel-board secured within the cabinet, a plurality of pairs of spaced brackets on the panel-board, a cover-section fitting on the cabinet over the panel-board and its brackets, and means for removably securing the cover-section in closing position on the cabinet, said means including a plurality of rigid hooks on the cover-section adapted to engage with a pair of said brackets, and a plurality of fastening members extending through the cover-section and engaging the cover-section and the other pair of said brackets.

8. The combination with a cabinet, of a panel-board secured within the cabinet, a cover-section fitting on the cabinet over the panel-board, means for removably securing the cover-section in closing position on the cabinet, said means including a fastening member removably projecting through the cover-section and engaging the panel-board, a strip fitting removably on the cover-section and projecting over said fastening member, and means for sealing said strip, and thereby said fastening member, against removal.

9. The combination with a cabinet, of a panel-board secured within the cabinet, an apertured cover-section fitting on the cabinet over the panel-board, means for removably securing the cover-section in closing position on the cabinet, said means including a fastening member removably projecting through the cover-section and engaging the panel-board, a second cover-section removably fitting upon said first cover-section and closing the aperture therein, said second cover-section projecting over said fastening member, and means for sealing said second cover-section, and thereby said fastening member, against removal.

10. The combination with a cabinet, of a panel-board secured within the cabinet, an apertured cover-section fitting on the cabinet over the panel-board, means for removably securing the cover-section in closing position on the cabinet, said means including a fastening member removably projecting through the cover-section and engaging the panel-board, a stud projecting outwardly from the cover-section, a second cover-section fitting upon said first cover section to close the aperture therein, hooks on said second cover section engaging with the first cover-section to removably hold the second cover-section in aperture closing position, the second cover-section being provided with a perforation to accommodate said stud, and a seal engaging said stud for sealing said second cover-section, and thereby said fastening member, against removal.

11. The combination with a cabinet, of panel-supports mounted in the cabinet, a panel-board fitting within the cabinet, members on the front face of the panel-board adapted to engage with said supports, and fastening means engaging said members and supports for securing the panel-board in the cabinet.

12. The combination with a cabinet, of brackets mounted in the cabinet, a panel-board fitting within the cabinet, bars extending across, and spaced from, the front face of the panel-board for engaging with said brackets, and fastening members engaging said bars and brackets for securing the panel board in the cabinet.

13. The combination with a cabinet, of brackets mounted in the cabinet, a panel-board fitting within the cabinet, slotted strap-bars extending across, and spaced from, the front face of the panel-board for engaging with said brackets, and fastening members extending through the slots of said bars and engaging said brackets for adjustably securing the panel-board in the cabinet.

14. The combination with a cabinet, of a panel-board mounted within the cabinet, main-service-line terminals mounted on the panel-board, an apertured cover-section fitting on the cabinet over the panel-board and its said terminals, a door on the cover-section for removably closing the aperture therein, and a housing embracing said terminals, said housing being positioned within the cabinet and beneath the cover-section and providing a barrier to prevent access to said terminals when said door is in open position.

15. The combination with a cabinet, of a panel-board mounted within the cabinet, terminals mounted on the panel-board, an apertured cover-section fitting on the cabinet over the panel-board and said terminals, and a housing embracing said terminals, said housing being positioned within the cabinet and beneath the cover-section and providing a barrier to prevent access to said terminals through said apertures.

16. The combination with a cabinet, of a panel-board mounted within the cabinet, terminals mounted on the panel-board, an apertured cover-section fitting on the cabinet over the panel-board and said terminals, and housing-walls embracing said terminals, said walls being fixed upon the panel-board and projecting from the panel-board to approximately the under face of the cover-section and providing a barrier to prevent access to said terminals through said aperture.

17. The combination with an inclosing cabinet, said cabinet including a rear wall, end walls, and side walls, of a panel-board mounted securely wholly within the cabinet, a cover-section fitting upon the end and side walls of the cabinet and extending over the panel-board, and means having engagement with the cover-section and panel-board for fastening the cover-section rigidly in closing position upon the cabinet.

18. The combination with a cabinet, of a panel-board adapted to fit within the cabinet, a cover adapted to fit upon the cabinet, and members on the panel-board providing means for the securing of the panel-board within, and the cover upon, the cabinet.

19. The combination with a cabinet, of a panel-board adapted to fit within the cabinet, a cover adapted to fit upon the cabinet, and rigid strap-members fixed to the panel-board, said strap-members providing means for the securing of the panel-board within, and the cover upon, the cabinet.

20. The combination with a cabinet, of a panel-board adapted to fit within the cabinet, a cover adapted to fit upon the cabinet, and rigid strap-members fixed at their ends to, and having portions spaced from the front face of, the panel-board, said strap-members providing means for the securing of the panel-board within, and the cover upon, the cabinet.

21. The combination with an inclosing cabinet having a rear wall and projecting end and side walls, of a panel-board mounted securely wholly within the cabinet, brackets fixed on the panel-board, a cover-section adapted to fit upon the end and side walls of the cabinet and extend over the panel board and its brackets, and means having engagement with the cover-section and brackets for fastening the cover-section rigidly in closing position upon the cabinet.

In testimony whereof I have signed my name to this specification.

WILLIAM WURDACK.